D.C. RESTORATION CIRCUIT WITH ARC-OVER PROTECTION
Filed June 12, 1967
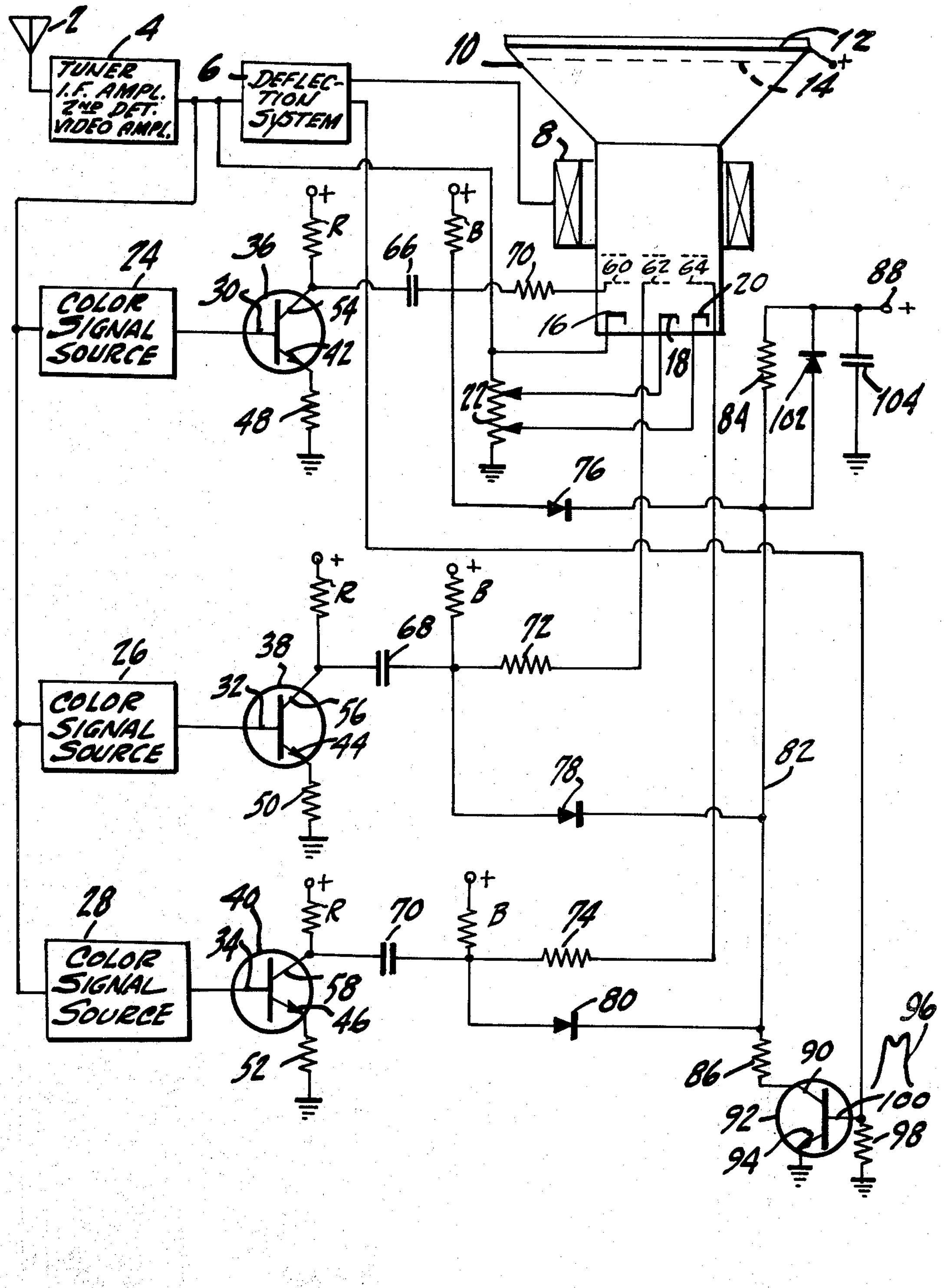
INVENTOR
ALLEN LEROY LIMBERG
BY Donald H. Tinklie
ATTORNEY United States Patent Office 3,535,436

Patented Oct. 20, 1970

3,535,436

D.C. RESTORATION CIRCUIT WITH ARC-OVER PROTECTION

Allen Le Roy Limberg, Somerville, N.J., assignor to RCA Corporation, a corporation of Delaware Filed June 12, 1967, Ser. No. 645,354
Int. Cl. H04n 5/18
U.S. Cl. 178—5.4 5 Claims

ABSTRACT OF THE DISCLOSURE

Each of a plurality of video drive amplifiers is coupled via a capacitor to a different control grid of a color kinescope. Direct current level of the signals applied to the grids is set by keyed clamp circuits having a diode connected to each grid. Protection of the amplifier against arc-over to the grids is afforded by a diode in series with the clamping diodes.

This invention relates to means for protecting amplifiers that are A.C. coupled to electrodes subject to arc-over from a high voltage source.

In color television receivers, for example, it is often desirable to A.C. couple the output electrodes of transistor amplifier to respective control grids of a color kinescope. Whether the amplifiers supply color difference signals or red, green and blue video signals, circuits are generally provided for establishing the control grids of the kinescope at a predetermined direct current potential during the line retrace periods. Arc-over from high voltages electrodes to the control grids can cause a surge of current that will impair or destroy the transistors.

When vacuum tube amplifiers are used, they can be protected from such surges by the use of spark gaps. Transistor amplifiers cannot withstand as high voltages as vacuum tube amplifiers, nor is there as large a safety margin between operating voltage levels and damaging voltage levels, and the resulting requirements on a spark gap device makes it an uneconomical solution.

In accordance with this invention, adequate protection is afforded to the amplifiers by clamping the control grids of the kinescope to a heavily bypassed source of direct current voltage through the diodes that are used in the direct current level setting cicuit and one additional diode that is connected in series with them.

The features of the invention which are presently believed to be novel are set forth in the appended claims. The invention, both as to its organization and manner of operation may be best understood by reference to the following description taken in conjunction with the accompanying drawing.

In the drawing, signals intercepted by an antenna 2 are applied to means 4 that includes a tuner, intermediate frequency amplifier, second detector and video amplifier. The video signals are coupled to a deflection system 6 that supplies deflection currents to a yoke 8 that deflects the electron beams of a color kinescope 10 so that they scan a raster on the target structure such as a phosphor dot screen 12 and an apertured mask 14. In a receiver wherein the matrixing of the luminance, or Y signals, and the color difference signals is performed within the kinescope 10, the video signals are applied with appropriate relative levels to the respective cathodes 16, 18 and 20 via a multiple tap potentiometer 22.

The video signals are also coupled from the means 4 to each of the color signal sources 24, 26 and 28, which, in the particular circuit shown, develop the color difference signals R—Y, G—Y and B—Y respectively. Base electrodes 30, 32 and 34 of the transistor driver amplifiers 36, 38 and 40 are respectively coupled to the signal sources 24, 26 and 28 and their emitter electrodes 42, 44 and 46 are respectively connected to ground by degenerative resistors 48, 50 and 52. The collector electrodes 54, 56 and 58 are respectively coupled to the control grids 60, 62 and 64 via coupling capacitors 66, 68 and 70 in series with delay resistors 70, 72 and 74. Collector resistors R are connected between each of the collector electrodes 54, 56 and 58 and a point of positive direct current operating voltage. Bias voltage for the control grids 60, 62 and 64 is supplied by the direct current connection of the resistors R to a point of positive operating potential, and, although not shown, means are provided for establishing the cathodes 16, 18 and 20 at a more positive potential then the grids in order to set the bias at a correct operating point.

The loss of the direct current level of the color difference signals resulting from the use of the capacitors 66, 68 and 70 can be restored by keyed clamp circuits in which diodes 76, 78 and 80 are respectively connected in direct current paths between the control grids 60, 62 and 64 and a lead 82 that joins resistors 84 and 86. These resistors are connected in series between a point 88 of positive potential and the collector electrode 90 of a transistor 92. The emitter electrode 94 is connected to ground, and positive flyback pulses 96 derived from the deflection system 6 during the line retrace intervals are applied across a resistor 98 that is connected between the base electrode 100 and ground so as to cause saturated conduction in the transistor 92 and place its collector electrode 90 near ground potential. Thus, the transistor 92 acts as a switch. Between pulses 96 the transistor 92 has negligible conduction in view of the fact that ground potential is applied to both the emitter and base electrodes. This permits the elimination of any charge that has accumulated on the capactiors 66, 68 and 70 during the scanning of each line and sets the charge at a value determined by the difference between the voltages at the collector electrodes and the voltage on the lead 82. Since color difference signals are blanked during the line retrace interval, the voltage at the collector electrodes can be set at a level derived for a zero value of the color difference signals. It will be noted that when the transistor 92 conducts, the voltage on the lead 82 is reduced from that at the point 88 by the dividing action of the resistors 84 and 86, but that when the transistor 92 is not conducting, the situation that prevails during line scanning, the voltage on the lead 82 is more positive and equal to that at the point 88. Thus by making the voltage at the point 88 sufficiently positive, the diodes 76, 78 and 80 can be back biased so that they do not conduct during the scanning of a line.

With the circuit thus far described an arc-over from a high voltage point such as the ultor 12 to any of the control grids 60, 62, or 64 would produce a surge signal across the corresponding tansistor amplifier that could impair or even destroy it. In accordance with this invention, a doide 102 is connected between the lead 82 and the point of positive potential 88. The capacitor 104 that is connected between the point 88 and ground is the large capacitor usually found at the output of A.C. to D.C. power supplies for television receivers. If an arc-over occurs to any one of the controls grids, a low impedance path to ground is provided through its respective clamping diode, the protection diode 102 and the capacitor 104 so that the voltage at the grid cannot exceed the positive voltage applied at the point 88. This restricts the excursion of the surge voltage coupled through capacitors 66, 68, or 70 to the transistors 36, 38 and 40 to a value which they can withstand. The delay resistors 70, 72 and 74 form RC circuits with any stray capacitance to ground that limit the rate of buildup of the current flowing from the grids to a rate below that at which current can build up in the clamping diodes 76, 78, or 80 and the protection diode 102.

In some color television receivers, red, green and blue color signals are applied to the control grids 60, 62 and 64 respectively, thus avoiding the necessity of applying the luminance signals Y to the cathodes 16, 18 and 20. The voltages at the collector electrodes 54, 56 and 58 would correspond to black during the line retrace intervals when the charge on the capacitors 66, 68 and 70 is being adjusted. In either case one or more of the diodes 76, 78, or 80 acts in combination with the protection diode 102 that is connected in series with them to clamp the control grids 60, 62, or 64 to a positive potential.

What is claimed is:

1. In a color television receiver, the combination of:
   a cathode ray tube for producing images in color, said tube having a plurality of electron guns, each of said guns having a control grid,
   a plurality of color signal driver amplifiers each having an output electrode,
   a plurality of capacitors each one separately coupled between a different one of said control grids and the output electrode of a different one of said driver amplifiers,
   a terminal adapted to receive a source of operating potential,
   a capacitor coupled between said terminal and a point of reference potential,
   switching means and at least one resistor coupled in a series path between said terminal and a point of reference potential,
   a plurality of unidirectional current conducting devices each having at least first and second electrodes, said second electrodes being connected to the junction of said resistor and said switching means, said first electrodes each individually coupled to a different one of said control grids of said cathode ray tube; said devices being poled for easy current conduction from said control grids to said junction,
   unidirectional current conducting means coupled in shunt with at least a portion of said resistor and poled in a direction for easy current conduction from said junction to said terminal.

2. In combination,
   a plurality of amplifiers, each having an output electrode,
   means having a plurality of control electrodes,
   capacitors coupling each of said output electrodes to a different one of said control electrodes,
   a plurality of unilateral conducting devices, each having first and second electrodes, each of said first electrodes being direct current coupled with like polarity to a different one of said control electrodes,
   means for periodically connecting said second electrodes of said unilateral current conducting devices to a point of reference voltage,
   unilateral current conducting means connected to said second electrodes of each of said unilateral current conducting devices with such polarity that current can flow through any one of said devices and said means, and
   means coupled to said unilateral current conducting means for providing a low impedance current path for said current which can flow through any one of said devices and said unilateral means.

3. The combination according to claim 2, further including,
   a source of positive potential, and resistors connected from said source of positive potential to each of said control electrodes.

4. In combination with apparatus including,
   a plurality of amplifiers, each having an output electrode, each of said output electrodes being coupled via a capacitor to a separate one of a plurality of control electrodes associated with a display means,
   switch means having first and second terminals, said first terminal being connected to a point of reference potential, and
   unidirectional current conducting devices connected in a direct current path and with like polarity from each of said control electrodes to said second terminal of said switch means, and means for periodically closing said switch means,
   the improvement therewith including apparatus for protecting said amplifiers from an arc-over to said control electrodes, comprising,
   a source of direct current potential having a low current surge impedance,
   a unidirectional current conducting device connected between said source and said second terminal of said switch means with such polarity that current can flow through said latter unidirectional circuit conducting device and any one of said first mentioned unidirectional circuit conducting devices, the polarity and magnitude of the voltage supplied by said source being such as to back bias all of said unidirectional current conducting devices for the normal excursions of voltage at said control electrodes when said switch is open.

5. In a television receiver including a kinescope having at least one control electrode which is coupled to an output electrode of a separate driver amplifier via a capacitor, said receiver including a D.C. restoring circuit for said electrode, which circuit includes a first unidirectional current conducting device having one electrode coupled to the junction between said capacitor and said control electrode and another electrode coupled to an output terminal of a source of keying pulses for periodically rendering said device conductive, in combination therewith, apparatus for protecting said amplifier from kinescope arc potentials as undesirably applied to said control electrode comprising,
   (a) means, including a second unidirectional current conducting device, having first and second electrodes, and having said first electrode coupled to the junction between said other electrode of said first unidirectional device and said output terminal of said keying pulse source, for causing current due to said kinescope arc potentials to flow through said first unidirectional device and through said second unidirectional device in the forward direction,
   (b) means coupled to said second electrode of said second unidirectional device for providing a low impedance path to a point of reference potential for said currents flowing therethrough due to said kinescope arc potentials.

References Cited

UNITED STATES PATENTS

| | | | |
|---|---|---|---|
| 2,938,073 | 5/1960 | Lockhart | 178—5.4 |
| 2,938,946 | 5/1960 | Macouski | 178—5.4 |
| 3,043,909 | 7/1962 | Loughlin | 178—7.5 |
| 3,113,177 | 12/1963 | Carnt et al. | 178—5.4 |
| 3,272,914 | 9/1966 | Moles et al. | 178—7.5 |

RICHARD MURRAY, Primary Examiner

J. C. MARTIN, Assistant Examiner

U.S. Cl. X.R.

178—7.5